Dec. 27, 1938.                J. H. RICH                2,141,224
                              PRUNING TOOL
                         Filed Feb. 17, 1937          2 Sheets-Sheet 1
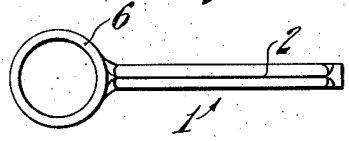
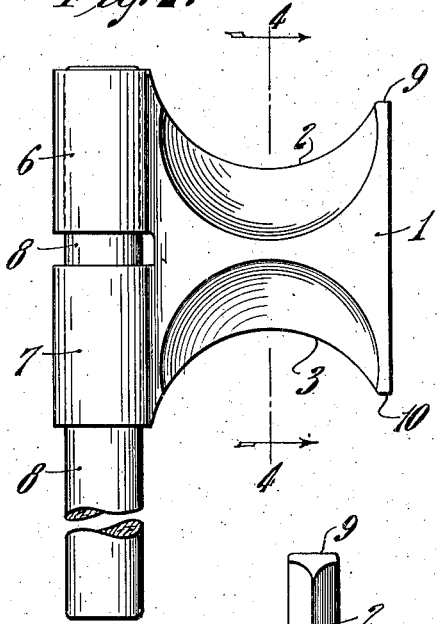
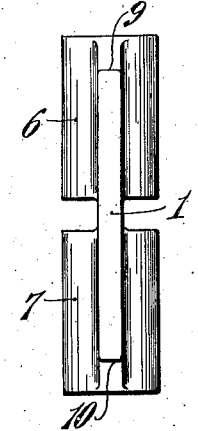
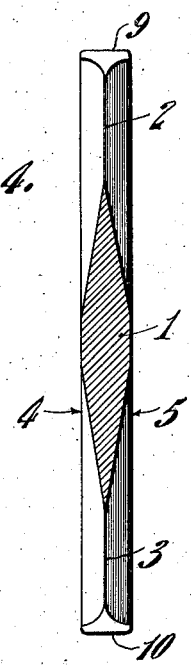
INVENTOR,
Joseph Harry Rich,
BY
ATTORNEY.

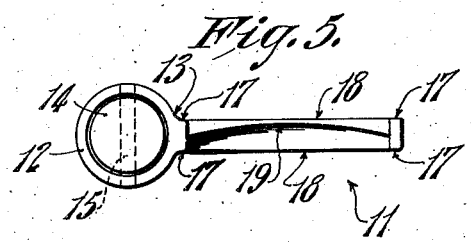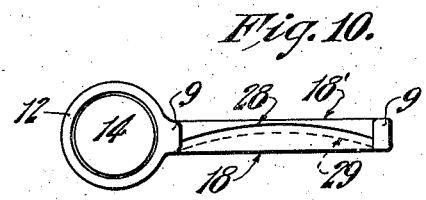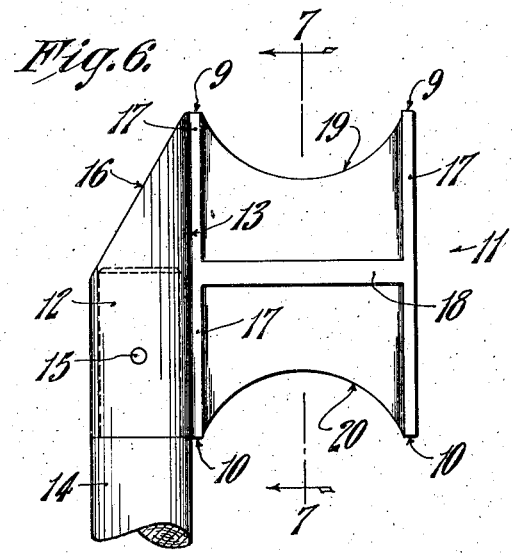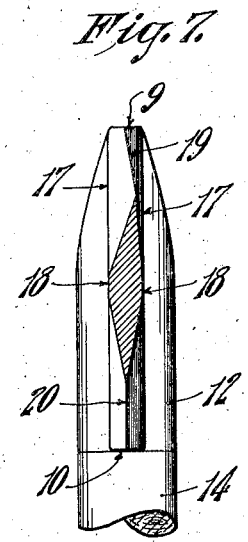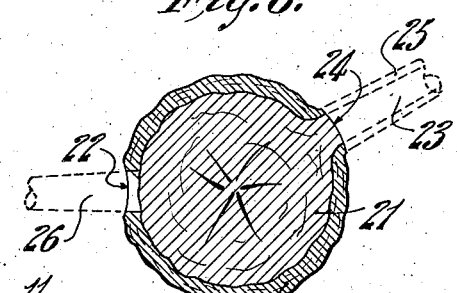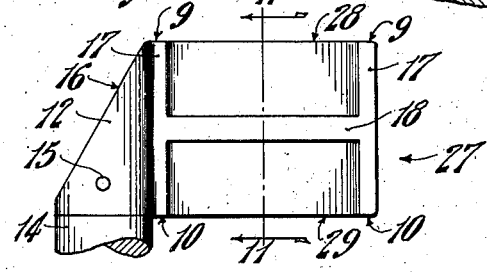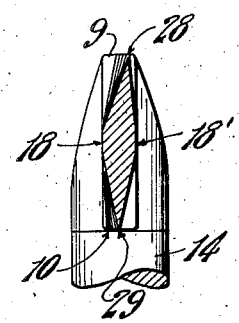
INVENTOR,
Joseph Harry Rich,
BY
Blake Seaver
ATTORNEY.

Patented Dec. 27, 1938

2,141,224

UNITED STATES PATENT OFFICE 2,141,224

PRUNING TOOL

Joseph Harry Rich, Amherst, Mass.

Application February 17, 1937, Serial No. 126,208

11 Claims. (Cl. 30—314)

This invention relates to improvements in pruning tools, and particularly to improvements on the pruning tool disclosed, described, and claimed in my Patent Number 2,006,874, issued July 2, 1935.

An object of this invention is to provide a pruning tool for severing the branches or limbs of trees or shrubs, which will cleanly sever the member, without tearing or stripping the live bark and tissue adjacent the member to be removed.

A further object of this invention is to provide a pruning tool which may be used without danger of injuring other parts or members of a tree or shrub while removing the desired dead or live branch or other blemish. I accomplish this object by eliminating all sharp points, and by providing blunt portions or noses at the extremities of all cutting edges.

A further object of this invention is to provide, in a pruning tool, means for severing a limb or branch in such a manner as to leave a butt having its perimeter flush with the surrounding wood and having either a concave or convex surface, as conditions may require. It is a well known fact among those skilled in forestry and kindred arts that in pruning it is essential to quick and healthy healing that the pitch-producing tissue adjacent the cut must be wounded sufficiently to permit the exudation of pitch to cover the exposed face of the cut, as a protection against injury from the action of insects and fungus growths. Furthermore, the exposure of green tissue is desirable for quick and healthy healing. The type of cut best suited to produce these results depends upon the condition of the limb to be severed, whether it is dead or alive, and whether a shoulder exists; also, the extent of growth of such a shoulder. It is an object of this invention to provide a pruning tool which will produce a cut resulting in rapid defectless healing, whatever the condition of the branch may be before it is removed by pruning.

These, and other objects and advantages of this invention, will be more completely described and disclosed in the following specification, the accompanying drawings, and the appended claims.

In my prior patent for a Pruning tool, No. 2,006,874, dated July 2, 1935, I have shown a pruning tool with certain features, among others, being cutting edges which are located in a plane that lies at an angle to the opposite sides of the blade and with the sides adjacent the cutting edges unequally ground. No provision was made to have the upper and lower ends of the cutting edges blunt, so as not to injure the work. Also, no means were provided for making an arcuate cut, so as to leave either a concave or convex surface. The invention in this application is directed to an improved construction at the extremities of the cutting edges, and to the provision of one or more arcuate cutting edges, and is not confined or limited to the offset relation of the cutting edges, as disclosed in the above-named patent.

Broadly, my invention comprises a flat blade member provided with a handle socket at one side edge, the blade member being formed with upper and lower opposed arcuate cutting edges which are concave, relative to a center line passing through the blade and perpendicular to its side edges, the cutting edges terminating short of the side edges of the blade, thereby providing a blunt nose portion at the extremities of the cutting edges, one or more of the cutting edges being curved relative to a face of the blade.

Preferred embodiments of this invention are illustrated in the accompanying drawings, in which:—

Fig. 1 is a top plan or edge view of a pruning blade, showing the upper cutting edge and the blunt ends and the handle socket in which a pole may be inserted.

Fig. 2 is a side elevational view of the blade shown in Fig. 1.

Fig. 3 is an end view looking from the right hand of Fig. 2.

Fig. 4 is a vertical sectional view on the line 4—4 of Fig. 2, showing the two cutting edges and the blunt, or flat extremities of the cutting edges.

Fig. 5 is a view similar to Fig. 1, showing a blade having a cutting edge which is curved, relative to the face of the blade.

Fig. 6 is a side elevational view of the blade shown in Fig. 5.

Fig. 7 is a vertical sectional view, taken on the line 7—7 of Fig. 6.

Fig. 8 is a diagrammatic plan sectional view of a tree, indicating the types of cuts possible with the blade illustrated in Figs. 5, 6, and 7.

Fig. 9 is a side elevational view of a modified form of blade.

Fig. 10 is a top plan view of the blade, shown in Fig. 9, and

Fig. 11 is a cross sectional view, taken on the line 11—11 of Fig. 9.

Referring now to the drawings in detail, in which like numerals refer to like parts throughout:—

1 indicates the blade of the tool, as a whole, having oppositely located curved cutting edges 2 and 3, which are located in a plane that is located midway between the opposite faces 4 and 5 of the blade 1. 6 and 7 indicate integral tubular portions for receiving a supporting pole 8. 9 and 10 indicate the upper and lower portions of the blade 1, which, as shown, are flattened, or blunt, for the purpose of preventing injury to the tree on which the work is to be done. If these extremities of the cutting edges were not flattened, or blunt, but were ground to sharp ends or points, they would cut or otherwise injure the bark and tissue of a tree. Also, these sharp ends of the cutting edges would materially interfere in the use of the tool, where the trees or branches are close together.

A modified form of this invention is illustrated in Figs. 5, 6, and 7, and the results of its use are illustrated in Fig. 8. A blade 11 is formed with a handle or pole socket 12 on one of its side edges 13, in which a handle or pole 14 may be fixedly secured by means of a pin 15. The socket 12 is bevelled or tapered at 16 to permit close application of the tool to its work. The blade 11 is formed with flat side faces 17 and centrally disposed faces 18 which lie in parallel planes. The blade 11 is also formed with oppositely disposed arcuate cutting edges 19 and 20, which terminate at the faces 17, thus providing the blunt nose portions 9 and 10. As shown in Fig. 5, the upper or top cutting edge 19 is curved, relative to the faces 17 and 18, for purposes best explained by reference to Fig. 8.

In pruning methods, it is essential to rapid and healthy healing that the pitch-producing tissue adjacent the severed member be wounded sufficiently to permit the pitch to flow over the face of the cut, thereby protecting the wound and inducing new tissue to grow over and cover it. Where a dead limb or branch occurs, as shown at 26, the live tissue 25 of the tree 21 butts against the dead branch 26, and it is necessary to gouge into the tissue 25 around the branch 26, thus forming a concave face 22. Where a live limb or branch 23 is to be removed, the live tissue 25 extends outwardly on the branch 23, and the best practice is to form a convex face 24.

It will be readily understood by those skilled in the art that either of the cuts 22 or 24 may be made with equal facility by means of the cutting edge 19.

Whereas, I have shown and described a pruning blade having only the top, or upper edge 19, curved with relation to the faces 17 and 18, it is, in some cases, desirable to have both the top edge 19 and the bottom edge 20 curved, and therefore, I do not limit myself to a single curved edge.

The blunt ends 9 and 10, at the extremities of the cutting edges 19 and 20, do not interfere in any way with the efficiency of the pruning blade, and serve as buffers to prevent injury to limbs and other growth adjacent the work being pruned.

A modified form of blade is shown in Figs. 9–11, inclusive.

For certain purposes, where limbs are very close together, and small in diameter, a narrow rectangular blade, such as that shown in Fig. 9, is preferable. Such a blade is also more economical of construction and more adaptable to confined or restricted conditions. As an example of such conditions, this blade would be particularly useful in the pruning of dense stands of spruce, jack pine, or similar growths.

A blade 27 is provided with a socket portion 12, blunt nose portions 9 and 10, and opposed side faces 17 and 18, all similar to the construction in the blade 11. The blade 27 differs from the blade 11, however, in having parallel top and bottom cutting edges 28 and 29, and in being relatively shorter between the noses 9 and 10, as will be readily understood by a comparison of Figs. 6 and 9. The cutting edges 28 and 29 are concentrically curved, as shown in Fig. 10, and are offset from each other as shown in Figs. 10 and 11. This offset relation of the cutting edges 28 and 29 provides a clean cut, without tearing, or stripping, the adjacent tissue, when the edges 28 and 29 are used co-operatively in making bottom and top cuts, respectively, as described in detail in my patent, #2,006,874.

It will be noted that the construction disclosed in Figs. 9–11, inclusive, provides a pruning blade relatively much more narrow than the blades illustrated in Figs. 2 and 6, and therefore, more efficient in pruning operations in restricted conditions and dense growth.

What I claim is:—

1. As an article of manufacture, a pruning tool comprising a substantially rectangular flat blade having its top and bottom edges ground to form upper and lower arcuate concave cutting edges, the axes of said cutting edges lying in a plane parallel to and between the side faces of said blade, the ends of said cutting edges being spaced from the side edges of said blade to provide blunt, flat nose portions at the terminations of said cutting edges.

2. As an article of manufacture, a flat blade member having parallel side edges and formed with equal concave, arcuate, upper and lower cutting edges, the side edges of said blade terminating in flat, blunt nose portions adjacent the ends of said cutting edges, and socket means on one side edge of said blade for supporting a pole or handle.

3. As an article of manufacture, a pruning tool comprising, a blade member having parallel side edges and oppositely disposed top and bottom concave cutting edges, said cutting edges terminating at their extremities in flattened or blunt nose portions adjacent each side edge of said blade, for preventing injury to the work, as described.

4. As an article of manufacture, a pruning tool comprising, a blade member having parallel side edges and oppositely disposed upper and lower cutting edges which are concave relative to a horizontal plane passing between them, said cutting edges terminating at their outer ends in flattened or blunt surfaces adjacent said side edges for preventing injury to the work, as described, and an integral tubular socket on one side of said blade for engagement on a supporting pole or handle.

5. A pruning tool comprising, a flat substantially rectangular blade member having oppositely disposed upper and lower cutting edges which are concave relative to a horizontal plane perpendicularly bisecting the side edges of said blade, said cutting edges being located in a plane midway between the opposite faces of said blade, the outer ends of the cutting edges terminating in flattened horizontal surfaces adjacent the side edges of the blade that are blunt and will not injure the work when the blade is in use, as described.

6. A pruning tool comprising, a substantially rectangular flat blade having parallel side faces and side edges and provided with symmetrical, inwardly extending, arcuate top and bottom cutting edges, a tubular socket formed on one of the side edges of said blade, a pole in said socket, the side edge of said blade opposite said socket terminating at top and bottom in flat, blunt ends adjacent the ends of said cutting edges, one of said cutting edges being concave relative to a side face of said blade.

7. A pruning tool comprising, a flat rectangular member having parallel side faces and side edges, formed with top and bottom cutting edges oppositely disposed, said cutting edges being symmetrical and curved inwardly toward the horizontal central plane of said blade, said blade being formed with blunt nose portions at the ends of said side edges and adjacent the ends of said cutting edges, both of said cutting edges being also curved inwardly relative to the plane of a side face of said blade.

8. A pruning tool comprising, a flat rectangular member having parallel side faces and side edges and formed with top and bottom cutting edges oppositely disposed, said cutting edges being symmetrical and curved inwardly toward the horizontal central plane of said blade, said blade being formed with blunt nose portions at the ends of said side edges and adjacent the ends of said cutting edges, one of said cutting edges being also curved inwardly relative to the plane of a face of said blade, a socket formed on one side edge of said blade for receiving a supporting pole or handle, said socket being tapered at its upper end to provide clearance for the blade, as described.

9. A pruning tool comprising, a flat rectangular body member having parallel side faces and side edges and formed with oppositely positioned top and bottom cutting blade portions terminating in arcuate cutting edges which curve inwardly relative to the respective top and bottom edges of said blade, each of said blade portions being bounded on three sides by the flat, parallel faces of said body member, both of said cutting edges being also curved inwardly relative to the plane of one of said faces, a tubular sleeve formed on one of the side edges of said body member, and a supporting pole secured in said sleeve.

10. As an article of manufacture, a flat, rectangular pruning blade having parallel side faces and side edges and provided with parallel top and bottom cutting edges, said cutting edges terminating at each end of each cutting edge in blunt, flat nose portions located at the ends of said side edges, said cutting edges being concave relative to the plane of a face side of said blade.

11. As an article of manufacture, a flat rectangular pruning blade provided with parallel top and bottom cutting edges, the ends of said cutting edges being spaced from the side edges of said blade to provide blunt, flat nose portions at the ends of said side edges, said cutting edges being concave relative to the plane of a face of said blade, and said cutting edges being offset relative to each other.

JOSEPH HARRY RICH.